US012497872B2

(12) United States Patent
Narasimhan et al.

(10) Patent No.: US 12,497,872 B2
(45) Date of Patent: Dec. 16, 2025

(54) SINGLE PILOT FLUID LINE ACTUATION GAS LIFT VALVE AND RELATED SYSTEMS AND METHODS

(71) Applicant: CHAMPIONX LLC, Sugar Land, TX (US)

(72) Inventors: Ramamurthy Narasimhan, Frederick, CO (US); Andrew Poerschke, Frederick, CO (US); Dustin Sandidge, Frederick, CO (US); Stephen Burrows, Frederick, CO (US); Paul Roberts, Frederick, CO (US)

(73) Assignee: CHAMPIONX LLC, Sugar Land, TX (US)

( * ) Notice: Subject to any disclaimer, the term of this patent is extended or adjusted under 35 U.S.C. 154(b) by 47 days.

(21) Appl. No.: 17/887,249

(22) Filed: Aug. 12, 2022

(65) Prior Publication Data

US 2023/0258060 A1 Aug. 17, 2023

Related U.S. Application Data

(60) Provisional application No. 63/309,936, filed on Feb. 14, 2022.

(51) Int. Cl.
*E21B 43/12* (2006.01)
*F16K 31/363* (2006.01)

(52) U.S. Cl.
CPC .......... *E21B 43/123* (2013.01); *F16K 31/363* (2013.01)

(58) Field of Classification Search
CPC ............................. E21B 43/123; E21B 43/122
See application file for complete search history.

(56) References Cited

U.S. PATENT DOCUMENTS

| | | | | |
|---|---|---|---|---|
| 2,725,014 A * | 11/1955 | Pryor | E21B 43/123 137/155 |
| 3,362,347 A * | 1/1968 | Canalizo | E21B 43/123 137/155 |
| 3,476,135 A | 11/1969 | Canalizo | |
| 4,224,993 A * | 9/1980 | Huckaby | E21B 34/10 166/325 |
| 4,295,795 A | 10/1981 | Gass | |
| 5,022,427 A | 6/1991 | Churchman | |
| 9,611,720 B2 | 4/2017 | Sevheim | |

(Continued)

FOREIGN PATENT DOCUMENTS

| | | |
|---|---|---|
| CN | 112127859 A | 12/2020 |
| NO | 20201133 A1 | 10/2020 |
| WO | 2014118380 A3 | 12/2014 |

OTHER PUBLICATIONS

International Search Report for PCT/US2023/012378, May 9, 2023, 4 pages.
Written Opinion for PCT/US2023/012378, May 9, 2023, 6 pages.

*Primary Examiner* — Yanick A Akaragwe
(74) *Attorney, Agent, or Firm* — BKRIP LLC

(57) ABSTRACT

Gas lift valves, assemblies, systems, and methods include valves having a valve element for selectively placing a fluid inlet in communication with a fluid outlet, a biasing feature to bias the valve element in one of the open position or the closed position, and a single fluid control line actuator for supplying a force to the valve element to overcome the biasing force of the biasing feature and to move the valve element to the other one of the open position or the closed position.

22 Claims, 9 Drawing Sheets

(56) References Cited

U.S. PATENT DOCUMENTS

| | | | | |
|---|---|---|---|---|
| 10,851,628 | B1 | 12/2020 | Anderson | |
| 10,858,921 | B1 | 12/2020 | Juenke | |
| 11,391,130 | B2 | 7/2022 | Anderson | |
| 11,613,973 | B1 | 3/2023 | Turk | |
| 2015/0330183 | A1* | 11/2015 | Sevheim | E21B 34/10<br>166/375 |
| 2017/0009534 | A1 | 1/2017 | Sullivan et al. | |
| 2018/0156003 | A1* | 6/2018 | Hradecky | E21B 31/107 |
| 2021/0140303 | A1 | 5/2021 | Vincent, Sr. et al. | |
| 2021/0189850 | A1* | 6/2021 | Anderson | E21B 34/10 |
| 2022/0307353 | A1* | 9/2022 | Wildman, Sr. | E21B 47/06 |

* cited by examiner

SINGLE PILOT FLUID LINE ACTUATION GAS LIFT VALVE AND RELATED SYSTEMS AND METHODS

CROSS REFERENCE TO RELATED APPLICATIONS

This application claims the benefit of the filing date of U.S. Provisional Patent Application Ser. No. 63/309,936, titled "SINGLE PILOT FLUID LINE ACTUATION GAS LIFT VALVE AND RELATED SYSTEMS AND METHODS," filed Feb. 14, 2022, the disclosure of which is hereby incorporated by this reference in its entirety.

TECHNICAL FIELD

The present disclosure relates to gas lift valves used, for example, in the production of fluid from a wellbore. More specifically, the present disclosure relates to gas lift valves used in a wellbore that include a single actuation pilot line and a biasing feature for supplying gas to be used in an artificial lift process and related assemblies, systems, and methods.

BACKGROUND

Gas lift is a form of artificial stimulation, continuous or intermittent, of an oil well where a gas (e.g., a produced gas) is separated at a surface and reinjected along the production column or completion to lighten the specific gravity of the fluid in order to generate flow at the surface. The injection may be performed in multiple strategical positions between the surface and an endpoint of the well (e.g., the well toe).

For example, in oil and gas wells, hydrostatic pressure of fluid in the well may be too high to allow for unassisted production of fluids from within the formation. Gas lift may be employed to reduce the hydrostatic pressure above the lower area of the well and enable hydrocarbons to be recovered from the well.

A production tubing with one or more gas lift valves may be deployed into the well. One or more of the valves may be open and production liquid may initially fill the annulus between the casing and the production tubing, as well as the inside of the production tubing. A gas may then be supplied into the annulus at pressure, which will drive the gas-liquid interface in the annulus downward, below the level of the gas lift valve. The gas will then flow into the production tubing through the open gas lift valve and may partially fill the production tubing in a mixed phase condition. This will reduce the hydrostatic pressure at the bottom of the production tubing, enabling the reservoir pressure to overcome said hydrostatic pressure resulting in the upward motion of the production fluids until surface.

In some cases, the gas lift valves may initially all be open as the hydrostatic pressure provided by the column of fluid in the annulus may be below the closing pressure of the gas lift valves. Gas may be injected into the annulus, pushing the column of fluid downward until the shallowest valve is in communication with the gas. The gas may then proceed through the shallowest valve, as explained above. Gas may continue to be injected, further driving the gas-liquid interface downward in the annulus, until the gas reaches the next shallowest valve. When this occurs, the gas may begin flowing into the production tubing via the second valve. Further, the gas pressure in the annulus at the shallowest valve may drop below the closing pressure of the first valve, resulting in the first valve shutting. This process may repeat for each subjacent valve.

Gas lift valve systems generally use the injection pressure in the annulus to actuate the valves with a bellows assembly. This can potentially limit the number of valves that can be used while still staying within practical injection pressure constraints. Further, current gas lift valve technology is a challenge to build, due to pre-charged gas pressures, and control through the manufacturing process. Such valves generally rely on small equipment and meticulous manufacturing processes (e.g., soldering), which introduce the risk of failure downhole or throughout the manufacturing process.

SUMMARY

Embodiments of the instant disclosure may be directed to gas lift valves and related methods, which, for example, may enable flow from the casing to the production tubing or from the production tubing to the casing.

According to some embodiments, a gas lift valve including a housing, a pilot fluid inlet for receiving a pilot fluid from an upstream fluid source, a fluid inlet for receiving annulus fluid (e.g., a pressurized fluid, an annulus injected gas pressure, etc.) and a fluid outlet for conveying annulus fluids to a production column in a wellbore. The gas lift valve may further include: a valve element for selectively placing casing fluid in communication with the production fluid in an open position of the valve element and to restrict communication between the fluid inlet and the fluid outlet in a closed position of the valve element; a biasing feature to bias the valve element in one of the open position or the closed position; and a control or pilot line actuator for supplying a force to the valve element to overcome an opposing force created by the biasing feature and to move the valve element to the other one of the open position or the closed position.

In some aspects, the techniques described herein relate to a gas lift valve, including: a housing including: a pilot fluid inlet for receiving a fluid from an uphole or surface fluid source; a fluid inlet for receiving annulus fluid; and a fluid outlet for conveying annulus fluid to a production tubing in a downhole location of a wellbore; a valve element for selectively placing the fluid inlet in communication with the fluid outlet in an open position of the valve element and to restrict communication between the fluid inlet and the fluid outlet in a closed position of the valve element; a biasing feature to bias the valve element in a first state of the open position or the closed position; and a control pilot fluid line actuator for supplying a force to the valve element to overcome a biasing force of the biasing feature and to move the valve element to a second state of the open position or the closed position.

In some aspects, the techniques described herein relate to a gas lift valve system, including: a control fluid source; a plurality of gas lift valves coupled to the control fluid source by an actuation control pilot fluid line, each gas lift valve of the plurality of gas lift valves including: a housing including: a control fluid or pilot fluid inlet for receiving fluid from the fluid source through actuation control line or pilot line; a production fluid inlet connecting a casing or wellbore annulus to the housing; and a production fluid outlet for directing a casing fluid between a production tubing and a wellbore; a valve element for selectively placing the fluid inlet in communication with the fluid outlet in an open position of the valve element and to restrict communication between the casing fluid inlet and the production fluid outlet in a closed position of the valve element; a biasing element to bias the valve element in one of the open position or the closed position; and an actuator for supplying a force through the fluid from the control fluid source via the actuation control line to the valve element to overcome a biasing force of the biasing element and to move the valve element to the other one of the open position or the closed position; and a control system configured to supply the fluid from the control fluid source to one or more of the plurality of gas lift valves at a selected pressure.

In some aspects, the techniques described herein relate to a method of operating a gas lift valve assembly. The method may include: supplying, with an actuation control pilot fluid line, a pilot fluid from a fluid source into a wellbore valve at a selected pressure with a control system to one or more gas lift valves positioned at various elevational locations in the wellbore; actuating a valve element of the one or more gas lift valves with a force supplied by the pilot fluid via the actuation control line; and overcoming a biasing force of a biasing element of the one or more gas lift valves to move the valve element to one of an open position enabling fluid flow and/or injection gas flow through a respective gas lift valve of the one or more gas lift valves or a closed position restricting the fluid flow and/or injection gas flow through the respective gas lift valve of the one or more gas lift valves.

Features from any of the embodiments contemplated by the instant disclosure may be used in combination with one another, without limitation, in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

DETAILED DESCRIPTION

Figure 1:
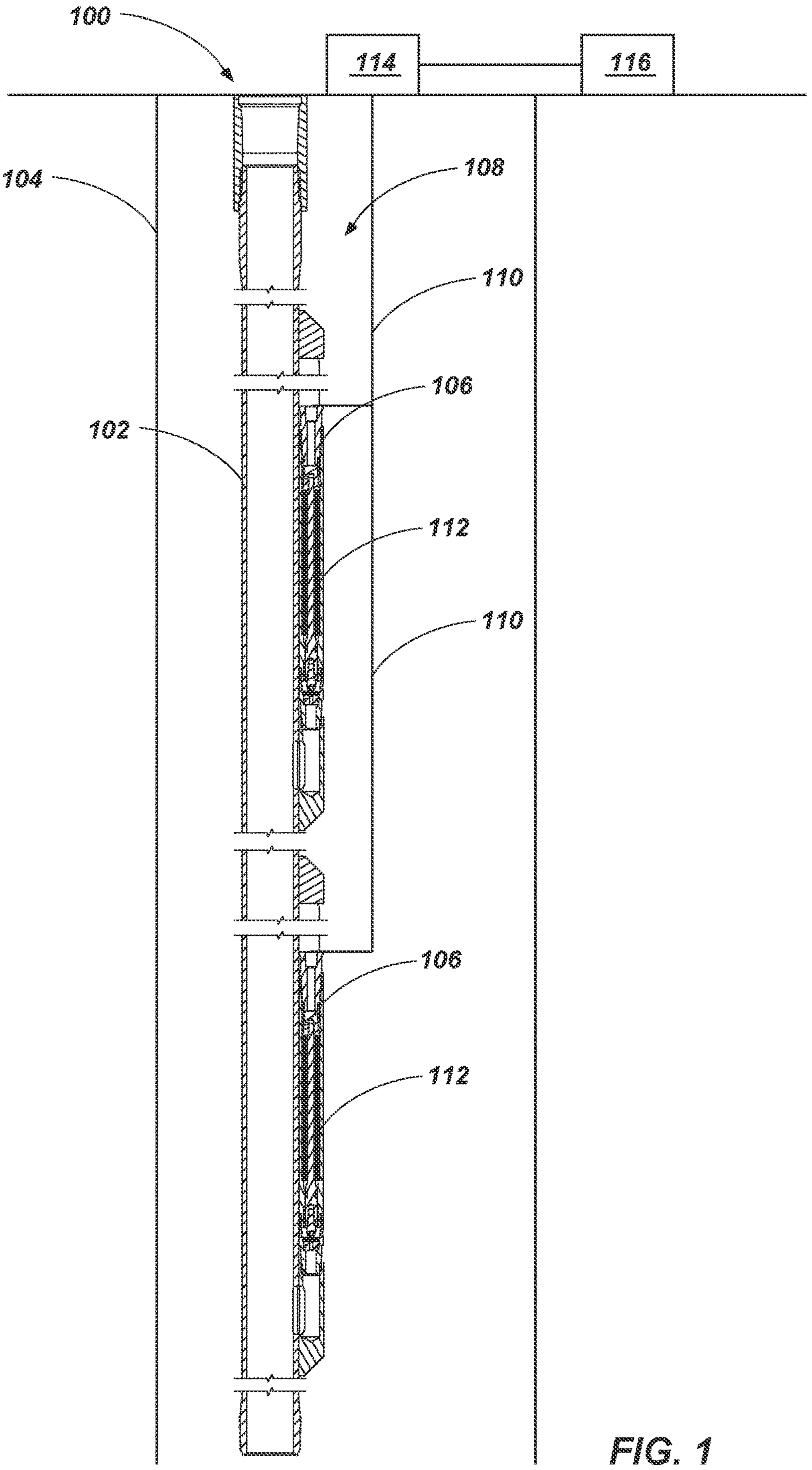
FIG. 1 is a simplified side or elevation view of a gas lift valve system including gas lift valves according to an embodiment of the disclosure.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in some embodiments," and similar language throughout this specification may, but do not necessarily, all refer to the same embodiment.

The illustrations presented herein are, in some instances, not actual views of any particular device, apparatus, system, or method, but are merely idealized representations that are employed to describe the present disclosure. In the following detailed description, reference is made to the accompanying drawings, which form a part hereof, and in which is shown, by way of illustration, specific embodiments in which the disclosure may be practiced. These embodiments are described in sufficient detail to enable a person of ordinary skill in the art to practice the disclosure. However, other embodiments may be utilized, and structural, logical, and other changes may be made without departing from the scope of the disclosure. The illustrations presented herein are not meant to be actual views of any particular device or system, but are merely idealized representations that are employed to describe embodiments of the present disclosure. The drawings presented herein are not necessarily drawn to scale. Additionally, elements common between drawings may retain the same or have similar numerical designations.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical," "lateral," "radial," "above" and "below" may refer to the orientations as depicted in the figures. When used herein in reference to a location in the wellbore, the terms "above," "upper," and "uphole" mean and include a relative position proximate the surface of the well, whereas the terms "below," "lower" and "downhole" mean and include a relative position distal the surface of the well.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

As used herein, the term "fluid" may mean and include fluids of any type and composition. Fluids may take a liquid form, a gaseous form, or combinations thereof, and, in some instances, may include some solid material. In some embodiments, fluids may convert between a liquid form and a gaseous form during a cooling or heating process as described herein. In some embodiments, the term fluid includes gases, liquids, and/or pumpable mixtures of liquids and solids.

Embodiments of the disclosure are related to improvements of gas lift valves and related systems and methods, along with improvements to design and control. For example, such gas lift valves may include biasing features (e.g., a mechanical reset device or other fluid, hydraulic, and/or electric biasing devices or apparatus as discussed herein). Actuation of such valves may be obtained by filling and increasing the internal pressure of a reservoir to at least partially overcome the biasing features of one or more of the valves (e.g., by compressing an elastic mechanism or fluid) with the fluid pressure applied to the individual valves via single actuation control lines (e.g., a control line for actuating the valve in only one direction). The valves are able to revert to a steady state condition as soon as the internal pressure is released.

In some embodiments, the valves may be configured as normally open valves as is discussed below. In such embodiments, when the fluid in the control lines is left at low pressure, the valve is open and no to little force is applied to the biasing feature (e.g., where a spring and/or fluid is substantially not compressed). As the pressure in the pilot fluid in the control lines increases, force is applied to the biasing features (e.g., compressing a spring, washer, or fluid) and closes the valve, preventing the fluid and/or injection gas from travelling through the valve into the production string or annulus.

In some embodiments, the valves may be configured as normally closed valves that may provide energy savings at the surface. For example, as the valves are normally closed during most of the valve operating time, the valves require little to substantially zero energy to maintain in the closed position. Further, in the case of equipment failure at the surface, the valves revert to being closed and will cease providing any injection gas into the production tubing. When the control pilot fluid is left at low pressure, the valve is closed and no to little force is applied to the biasing feature. As the control pilot fluid pressure increases, force is applied to the biasing features (e.g., compressing a spring, washer, or fluid) and the valve is opened, enabling the injection of casing, annulus or production fluid to travel through the valve and into the production tubing or annulus.

Such embodiments may improve the reliability of the valve itself by relying on mechanical components rather than compressed gas and bellows. Further, such embodiments may improve reliability of the completion and assembly by restricting the actuation to a single control pilot fluid line reducing the number of equipment connections and improving operator safety onsite during equipment installation. Further, such embodiments may reduce valve manufacturing cost by relying on simple design concepts, may reduce the valve operation costs by offering a design that does not necessitate a constant energy source to actuate, and may increase the safety of operations by automatically ceasing well stimulation in the case of loss of power at the surface of well.

Some embodiments of the disclosure may enable operators to maintain actuation control from the surface by the use of a single control pilot fluid line and the use of a reliable mechanical reset mechanism, which may improve the reliability of the tool and installation procedure both from a technology and an operator safety perspective. Such embodiments including a single control pilot fluid line may enable the ability to maintain basic operational modes of the valves by enhancing interchangeability and acceptance at operator level by reusing existing design volumes and standardizing parts. Further, design to accommodate single acting open or closing actuation that simplifies the internal design of the valve by targeting, but not restricted to, mechanical reset equipment, such embodiments may increase mechanical reliability of the completion by reducing the amount of equipment deployed downhole. Increasing valve control integrity by using a single control pilot fluid line for actuation may limit the number of fittings and connections and potential risk of leakage. Such embodiments may further increase completion reliability by enabling independent pilot control of the valves (e.g., in a parallel assembly) and increase part standardization by relying on common items and sized collars and/or shims.

In some embodiments, embodiments of the disclosure may assist in the challenges of pre-charged pressures in flowing wells and the impact of temperature reducing efficiency in the current systems, where such pre-charged pressures require pressure drops to allow the injection point to transfer downhole. However, such pressure drops generally do not allow the operator to maximize the injection gas compressor horsepower at surface to produce the well at its maximum rate at any given point in time. Multi-pointing may occur under these type of operational conditions, which may further reduce the efficiency of production in oil and gas wells. Embodiments of the current disclosure utilizing such single actuation control lines may enable an operator to maximize compressor return on invest and maximize production of the process by, for example, reducing the amount of premature failure in the system.

FIG. 1 is a simplified elevational view of a gas lift system 100, according to an embodiment. The gas lift system 100 may be configured to reduce hydrostatic pressure in a production tubing 102 that is deployed into a well casing 104. The gas lift system 100 may be configured to aid in the production of reservoir fluid (e.g., hydrocarbons), through the production tubing 102, and up to the surface above the production tubing 102.

The gas lift system 100 may include one or more valves 106 (e.g., depending on the depth and operation characteristics of the well 104) that may be positioned along the production tubing 102 and in an annulus 108 between the production tubing 102 and the well 104. The valves 106 may be similar or the same as any of the valves discussed herein. A control line 110 (e.g., a single control pilot fluid line) may extend from a surface system (e.g., located at the ground level) to the valves 106 and may be connected to the valves (e.g., in a serial and/or parallel configuration). The surface system may include a pressurized fluid source 114, such as a pump, and a tank 116. The pump system 114 includes one or more devices configured to modulate pressure of the fluid in the control pilot fluid line 110 (e.g., a pressure relief valve or pressure reduction valve). The pump system 114 may be configured to deliver a set control pressures to the pilot line 110, depending on the attributes of the well completion, to ensure the correct operation of the valves 106 positioned along the production tubing 102.

While single fluid control pilot fluid lines 110 are discussed herein, in additional embodiments, other actuation devices and methods may be implemented, such as, for example, as electronic actuation motor that actuates the valves.

As discussed herein, rather than the use of bellows or the use of controls lines, such as that disclosed in U.S. Pat. No. 10,851,628, the disclosure of which is incorporated by references in its entirety, the gas lift system 100 may include the control pilot fluid line 110 that acts to move the valves 106 in only one direction between and open and a closed position. For example, the valves 106 may be biased with a biasing feature 112 (e.g., by mechanical, fluid, and/or hydraulic mechanisms) in an open or a closed position (e.g., normally open or normally closed). The control pilot fluid line 110 may act to move the valves 106 to the positioned in which the valves 106 are not biased. By way of example, the valves 106 may be biased in an open position with a mechanical energy biasing feature or elements (e.g., wave springs, disk washers, other types of springs, such as, helical, constant, non-linear, compression, extension, or wave, or combinations thereof, etc.).

In some embodiments, the mechanical energy biasing feature or elements may comprise disc washers (e.g., conical spring washer, disc spring, etc.) and/or wave springs. When implements, disc washers may be formed in a conical (e.g., frustoconical) shape in an initial or natural position. Force applied to the disc washer (e.g., compression) may deform the washer toward a flat shape, thereby, storing energy (e.g., potential energy) in the washer. When the force is released, the washer may apply a reverse force (e.g., releasing the potentially energy) to return to substantially its initial shape. In a similar manner, wave springs may operate in a similar manner. However, the wave spring may be formed in edge-winding process where waves in the spring provide an undulating shape. When compressed under a force, the waves may deform the wave spring toward a flat shape, thereby, storing energy (e.g., potential energy) in the wave spring. When the force is released, the wave spring may apply a reverse force (e.g., releasing the potentially energy) to return to substantially its initial shape.

Such washers and/or wave springs may be stacked in a series to provide a desirable spring constant value. As noted above, the washers and/or wave springs may be stacked in in a series orientation, a parallel orientation, or a series parallel orientation.

In embodiments where springs and/or washers are implemented, multiple elements (e.g., washers) may be positioned in parallel, series, or series parallel in order to provide the desired stiffness in each valve for a given application, where the stiffness in each valve or sets of valves may differ from other valves (e.g., valves that are positioned in an uphole or downhole direction).

The control pilot fluid line 110 may act against the biasing force of the biasing feature 112 of the valves 106 to close the valves 106 and, when such force is removed, the valves 106 may return to the normally open position. As noted above, in additional embodiments, fluid, hydraulic, and/or pneumatic energy devices (e.g., pinch valve technology) and/or electronic or electrical energy devices (e.g., a magnetic bias actuator, an actuating motor) may be used to position (e.g., bias) the valves 106 in an open condition or a closed condition.

Each of the valves 106 may have a different pilot actuation force between the precedent and subsequent valves 106 (e.g., a pressure differential). The pilot actuation force required to actuate each of the valves 106 may be different than one or more of the other valves 106 (e.g., different than one or more vertically adjacent valves 106, different than each other valve 106 that is positioned along the production tubing 102). For example, one of the valves 106 may be configured to close at a first amount of force applied by the control pilot fluid line 110 (e.g., sufficient to overcome the biasing force) and remain closed. Another of the valves 106 (e.g., a valve 106 at a next longitudinal position along the tubing 102) may be configured to close at a second amount of force (e.g., a greater amount of force) applied by the control pilot fluid line 110 and remain closed. This pattern of increasing closing pressure differentials may continue for all or a majority of the remaining valves 106 extending down into tubing 102.

When the valves 106 are open, the valves 106 permit wellbore fluid to flow from the annulus 108 into the production tubing 102. For example, gas may be injected into the annulus 108, which is otherwise full of fluid (e.g., liquid, gas, or a combination thereof). As the gas pressure increases, the interface between the gas and liquid is driven downwards into the well 104. When the valves 106 are closed, the valves 106 block fluid flow through the respective closed valves 106 and into production tubing 102. When the valves 106 are open, the valves 106 enable gas to flow into the production tubing 102, generally at the depth where the uppermost open valve 106 is positioned.

By using the single control pilot fluid line 110 to control actuation, the gas lift system 100 may apply a greater range of forces (e.g., pressures) to separately actuate the valves 106. For example, the range of actuation pressures used in the control line 110 may be above pressures that, if experienced in the wellbore fluid in the annulus 108, would damage the well 104 and/or are beyond the practical capabilities of wellbore pumping equipment that is commonly used for artificial lift. In some applications, gas injection into the annulus 108 may be generally performed around 1200 to 1400 psi. If annulus injection pressure is used to actuate the valves 106, valve actuation pressures will also be required to account for instrument and device variance and as such target an operational differential pressure of 80 to 100 psi between each valve 106. However, since a separate fluid pressure is employed in embodiments of the gas lift system 100, the valve actuation pressures can be outside of this range. For example, the use of the pump and a generally incompressible fluid may be implemented. Further, the hydrostatic pressure acting through the control line 110 may be employed to balance the pressure in the valves 106 and/or to assist in opening or closing the valves 106.

Figure 2:
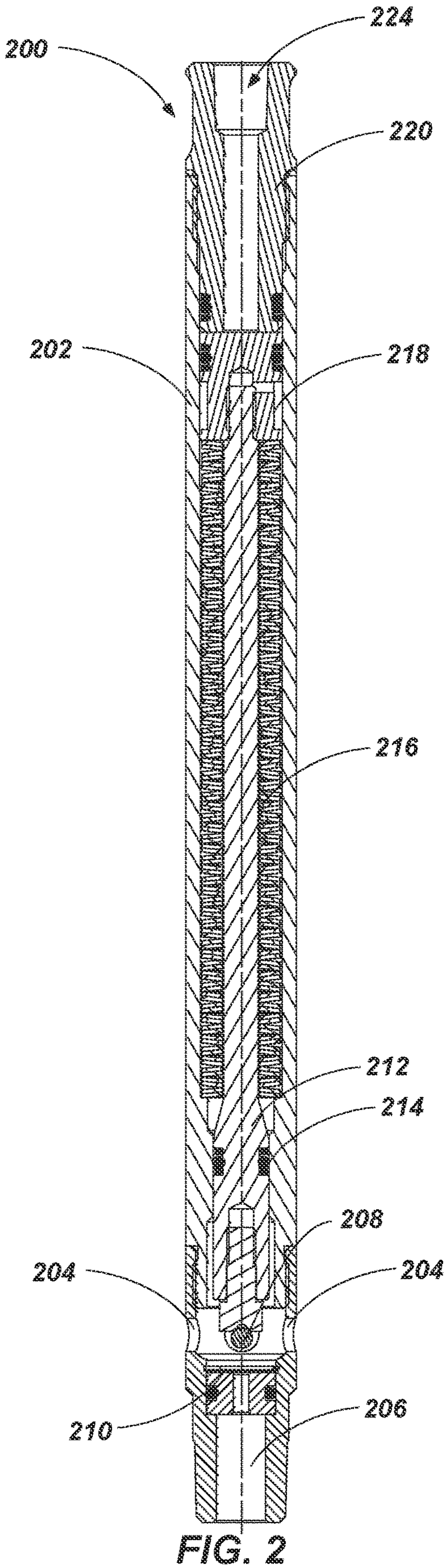
FIG. 2 is a cross-sectional view of a gas lift valve in an open position according to an embodiment of the disclosure.
Figure 3:
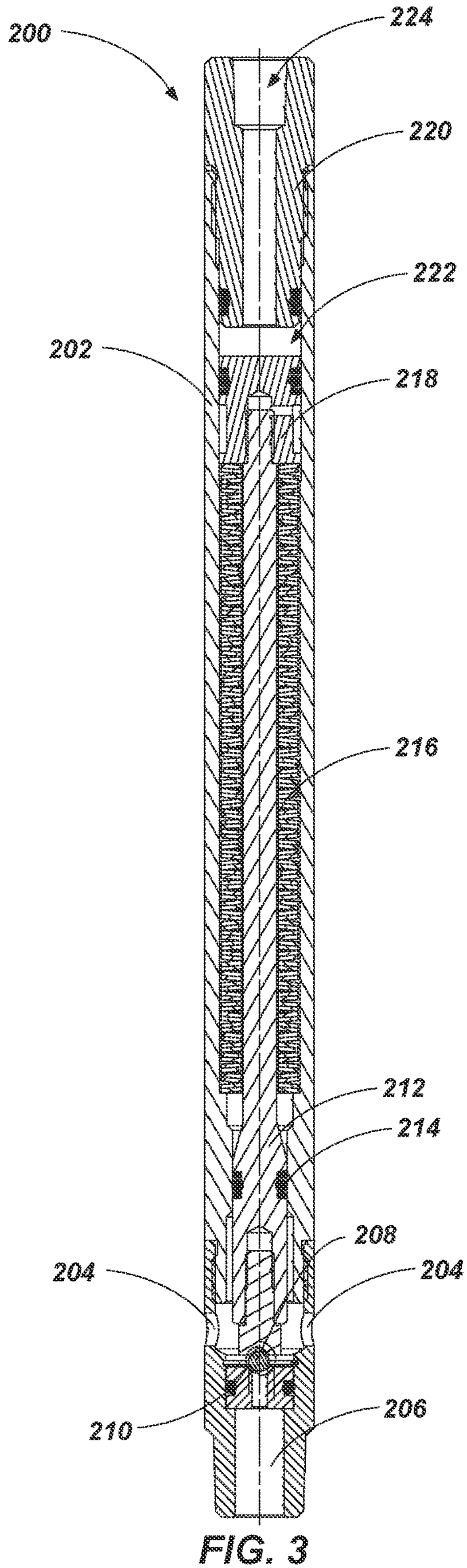
FIG. 3 is a cross-sectional view of the gas lift valve in FIG. 2 in a closed position.

FIG. 2 is a cross-sectional view of a gas lift valve 200 in an open position. FIG. 3 is a cross-sectional view of the gas lift valve 200 as shown in FIG. 2 in a closed position. As shown in FIGS. 2 and 3, the gas lift valve 200 includes a housing 202 having one or more fluid inlets and outlets. For example, the housing 202 may define gas injection ports 204 and a gas outlet 206. As depicted, the gas injection ports 204 may extend radially through the housing 202 and are in communication with the annulus 108 (FIG. 1) for receiving supplied gas from an uphole location. The housing 202 may have an open axial end defining the gas outlet 206 that may be in communication with the interior of the production tubing 102 (FIG. 1) directly or indirectly via an independent check valve.

The gas injection ports 204 and the gas outlet 206 may be separated by a valve element 208 (e.g., a spherical element, such as a ball or cartridge seat) that engages with a valve seat 210 to selectively enable and restrict fluid communication between the gas injection ports 204 and the gas outlet 206. While the instant embodiment implements a ball in a check valve arrangement, other restriction devices or methods may be implemented in additional embodiments.

Movement of the valve element 208 may be controlled by a valve stem 212 that moves (e.g., translates) through the housing 202 to secure the valve element 208 into the valve seat 210 in the closed position shown in FIG. 3 and enable the valve element 208 to move away from the valve seat 210 in the open position shown in FIG. 2, enabling fluid flow through the gas lift valve 200. As depicted, one or more seals

214 may be positioned between the valve stem 212 and the housing 202 in order to restrict or prohibit unwanted fluid flow around the valve stem 212. In some embodiments, the valve seat 210 may comprise a modular component that is secured and sealed to the housing 202 (e.g., to adjust the flow rate through the valve seat 210 to the gas outlet 206).

The valve stem 212 may extend through a portion of the housing 202 including a biasing feature 216 that applies a biasing force to the valve element 208 to position the valve element 208 in the open position or the closed position. For example, the biasing feature 216 may include a mechanical force element (e.g., one or more springs, or other devices, such those discussed above). As noted above, in some embodiments, the biasing feature 216 may include a fluid biasing element, a hydraulic biasing element, a pneumatic biasing element, or an electric biasing feature. As depicted, the biasing feature 216 may comprise a stack of springs for biasing the valve element 208 in an open position by forcing a piston 218 coupled to the valve stem 212 in an uphole direction (e.g., away from the valve seat 210).

A valve cap 220 may couple to the housing 202 to an external actuation control device. For example, the valve cap 220 may be coupled to an actuation control line, such as, for example, the control line 110 (FIG. 1), which may comprise a single (e.g., solitary) control pilot fluid line that runs from an uphole location to the gas lift valve 200 (e.g., without the use of any additional control lines). As above, the control line 110 may supply a fluid to the gas lift valve 200 at a selected pressure in order to overcome the biasing force of the biasing feature 216 and to actuate the valve element 208. For example, the valve cap 220 may enable the fluid to enter chamber 222 (e.g., via axial annulus 224 or via perpendicular annulus) in order to force the piston 218 downward toward the valve seat 210, overcoming the biasing feature 216, in order to close the gas lift valve 200. As shown in FIG. 2, movement of the piston 218 upward may act to reduce (e.g., substantially eliminate) the volume of the chamber 222. For example, in the open position, the piston 218 may substantially eliminate the chamber 222 and the valve cap 220 may contact the piston 218.

Figure 2A:
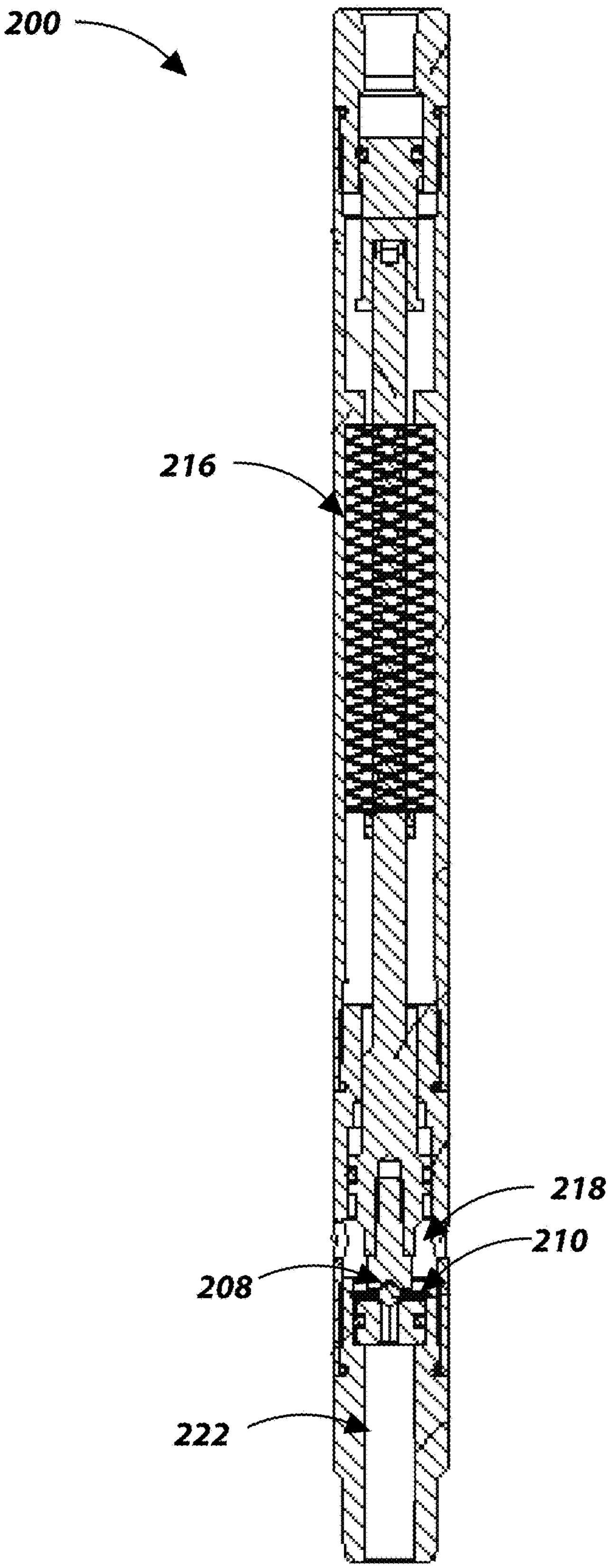
FIG. 2A is a cross-sectional view of a gas lift valve in a closed position according to another embodiment of the disclosure.
Figure 2B:
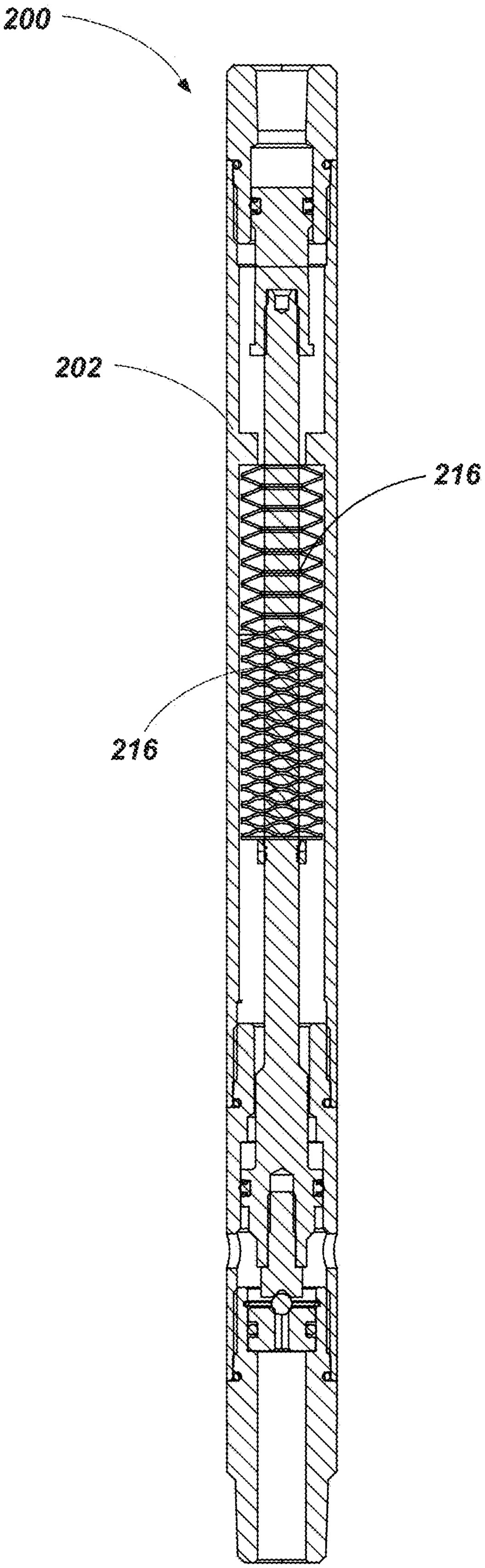
FIG. 2B is a cross-sectional view of a gas lift valve with disc spring washers and wave springs according to another embodiment of the disclosure.

As shown in FIG. 2A, in additional embodiments, the gas lift valve 200 may be configured such that the fluid in the chamber 222 may force the piston 218 away from the valve seat 210 against the biasing force of the biasing feature 216 in order to open the valve element 208, such as in a normally closed position.

Figure 4:
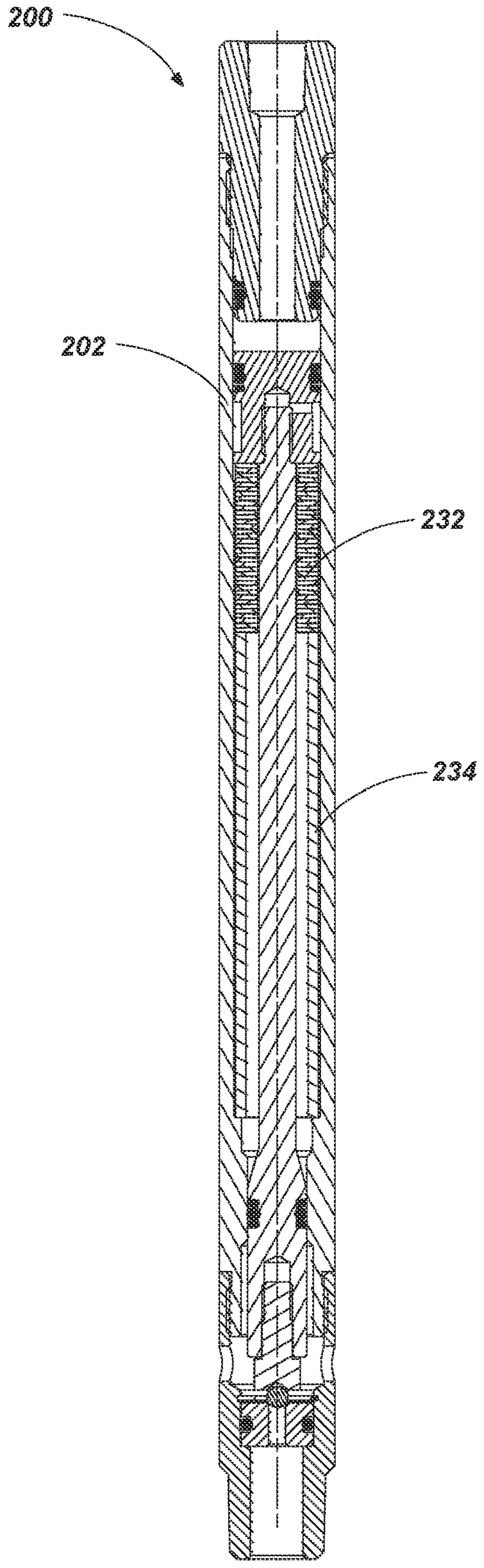
FIG. 4 is a cross-sectional view of a gas lift valve including a spacer according to an embodiment of the disclosure.

As discussed above, in a gas lift valve system, numerous gas lift valves 200 may be employed where the biasing force of the biasing feature 216 may differ in at least some of the valves 200. For example, the size (e.g., volume and/or amount) of the biasing feature 216 (e.g., springs, washers, fluid chambers) disposed in the housing 202 may differ between various configurations of the gas lift valves 200. As depicted in FIGS. 2 and 3, the biasing feature 216 may substantially fill a portion of the housing 202 configured to hold the biasing feature 216. However, as shown in FIG. 4, in another one of the gas lift valves 200, another biasing feature 232 may occupy relatively less space or volume in the housing 202. For example, the biasing feature 232 may include a relatively smaller biasing mechanism. In such an embodiment, a spacer 234 may be implemented to secure the biasing feature 232 in the housing 202 by extending through the portion of the housing 202 that is not used by the relatively smaller biasing feature 232 while securing the biasing feature 232 such that the biasing feature 232 still forces the valve element 208 in a desired direction.

Figure 5:
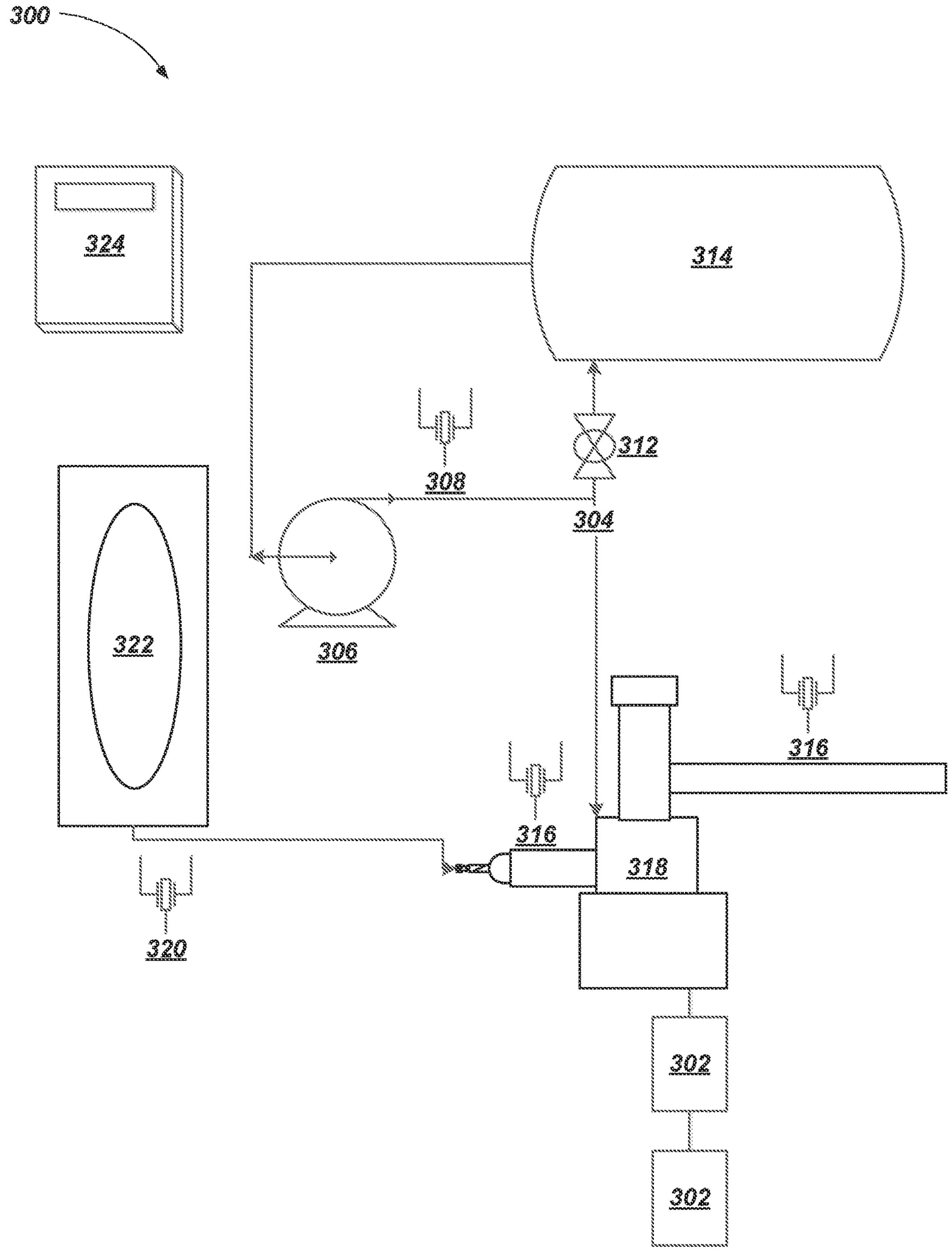
FIG. 5 is a schematic view of a surface equipment portion of a gas lift valve system according to an embodiment of the disclosure.

FIG. 5 is a schematic view of a surface equipment portion 300 of a gas lift valve system (e.g., the gas lift valve system shown in FIG. 1) as the surface equipment portion 300 (e.g., controls) interacts with one or more gas lift valves 302. As shown in FIG. 5, the surface equipment portion 300 may be coupled to the one or more gas lift valves 302 (e.g., which may be similar to gas lift valves 106 and/or gas lift valve 200) via a control capillary string 304 for use in position control of the valves 302 (e.g., a valve actuator). The capillary string 304 is connected to each of the gas lift valves 302 of the system to complete a contiguous line from the surface to the deepest gas lift valve 302 (e.g., as shown in FIG. 1).

The capillary string 304 may be connected to a pump (e.g., a fluid pump 306). In some embodiments, the capillary string 304 may be equipped with one or more sensors (e.g., an electronic pressure transmitter 308) that may be used to monitor the current surface injection pressure and/or a pressure safety valve. The capillary string 304 may be equipped with a valve (e.g., a normally closed electronically actuated valve 312) that may be used to vent capillary string fluid back to a fluid source 314 located at the surface.

In some embodiments, one or more sensors (e.g., pressure transmitters 316) may be installed on casing and tubing strings 318 at the surface to monitor operating pressures. Another sensor (e.g., gas injection pressure transmitter 320) may be positioned on high-pressure gas injection source 322 (e.g., a compressor and/or injection line) to monitor operation of the gas injection pressure at the surface.

A control system (e.g., automation controller 324) may be installed at the surface and may be configured to monitor and control one or more (e.g., each) of the devices of the surface equipment portion 300 by performing one or more artificial lift algorithms, system maintenance of the equipment, etc. In some embodiments, the information and configuration of the controller 324 may be made available to other surface devices or remote-control systems used in well and field management schemes.

Control of the valves 302 may be managed (e.g., by the automation controller 324) through increases in pressure in the capillary line or string 304 that supplies the pressurized fluid to one or more of the valves 302 where the valves 302 are in a normally open configuration. As the pressure builds, the uppermost valve 302 will close first as the pressure level required for closure is the lowest. Subsequent closure of the valves 302 will occur for each downhole valve 302 incrementally as the pressure continues to build in the line. In some embodiments, as discussed above, if a preselected maximum pressure is reached, a pressure safety valve may be activated to avoid over-pressurization of the assembly.

In an additional embodiment where the valves are normally closed, similar methods may be implemented. However, the valves would be pressurized to ensure incremental opening of the valves and maintaining the valves in the open position. As the pressure is depleted through the control line in the capillary, the valves would shut in sequential order in a downhole direction. Such an assembly of valves would be fully closed when no force is applied to the assembly (e.g., not energized from the surface). However, as above, the last valve in the downhole direction may remain open at all times.

An example operation of a gas lift system is provided below that may include any of the components discussed herein. In an example embodiment, the valves may include biasing features comprising mechanical devices (e.g., disc springs) that are listed in Table 1 to indicate the estimated hydrostatic pressure at the required installation depth in addition to the applied pressure generated by the surface pump to activate the valve position closed from its normally open position.

The number of valves may be determined by the specific well requirements as well as the depth of installation of each valve. The biasing force (e.g., the number of washer sets) may be calculated to ensure the appropriate resistive force is applied at depth and a large enough pressure differential exists between adjacent valves (e.g., adjacent valves directly above and/or directly below each valve). Such a pressure differential designed into the washer configurations may account for minor miscalculations of actual installed depth, thereby mitigating the risk of inadvertently closing or opening more than one valve within the surface pressure control range.

The valves positioned along the completion or production tubing may be actuated individually from the surface by increasing the pressure in the control line. Valves closer to surface would use a relatively higher number of disc washers, which will produce a relatively softer spring assembly (e.g., with a lower spring stiffness value) and an earlier closing of the valve at low control pressure. As the valves are deployed deeper into the wellbore, the valves would rely on relatively less washers to increase the assembly stiffness and require relatively higher pressures from the control line to close the valve.

TABLE 1

Example Valve Configuration

| Valve # | Installation Depth | # of Washer Sets | Hydrostatic psi | Surface Psi to Close valve | Valve surface psi delta |
|---|---|---|---|---|---|
| 1 | 986 | 31 | 17.61 | 426 | 426 |
| 2 | 2210 | 25 | 39.48 | 956 | 529 |
| 3 | 3502 | 21 | 62.55 | 1516 | 559 |
| 4 | 4284 | 18 | 76.52 | 1854 | 338 |
| 5 | 4998 | 16 | 89.28 | 2164 | 309 |
| 6 | 5712 | 14 | 102.03 | 2473 | 309 |
| 7 | 6392 | 12 | 114.18 | 2767 | 294 |
| 8 | 7004 | 11 | 125.11 | 3032 | 264 |
| 9 | 7515 | 10 | 134.22 | 3253 | 220 |
| 10 | 9010 | 9 | 160.94 | 3901 | 647 |

As discussed above, the system may begin with all the valves in the open position to begin artificial lift through the uppermost valve. As shown, this would require the pilot hydrostatic pressure to be less than target close pressure for valve #1, or 426 psi in this example as indicated in Table 1.

As the lift progresses, a deeper injection point may be required to maintain efficient well production. This may be determined based on the change in casing pressure over time. As liquids are evacuated from the casing, valve #2 in the normally open position will be uncovered allowing injection gas to migrate through both valve #1 and valve #2. This drop of casing pressure would indicate to the electronic controller that it is time to close valve #1 using pilot pressure 956 psi to resume single-point injection at valve #2.

To close valve #1, the electronic controller would start the injection pump and monitor the injection pressure until it reached the surface close pressure for valve #1, or 426 psi in this example.

After the target closing pressure for valve #1 has been achieved and maintained, casing pressure would be expected to return to a substantially normal operational range. Should the casing pressure exceed operational limits, the electronic controller may open valve #1 back up by activating a vent valve reducing the surface injection pressure below the closing setpoint of valve #1.

This sequence of valve transitioning may continue until each valve, is closed (e.g., with the exception of the deepest valve that may be an uncontrolled valve referred to in the industry as an orifice).

Figure 6:
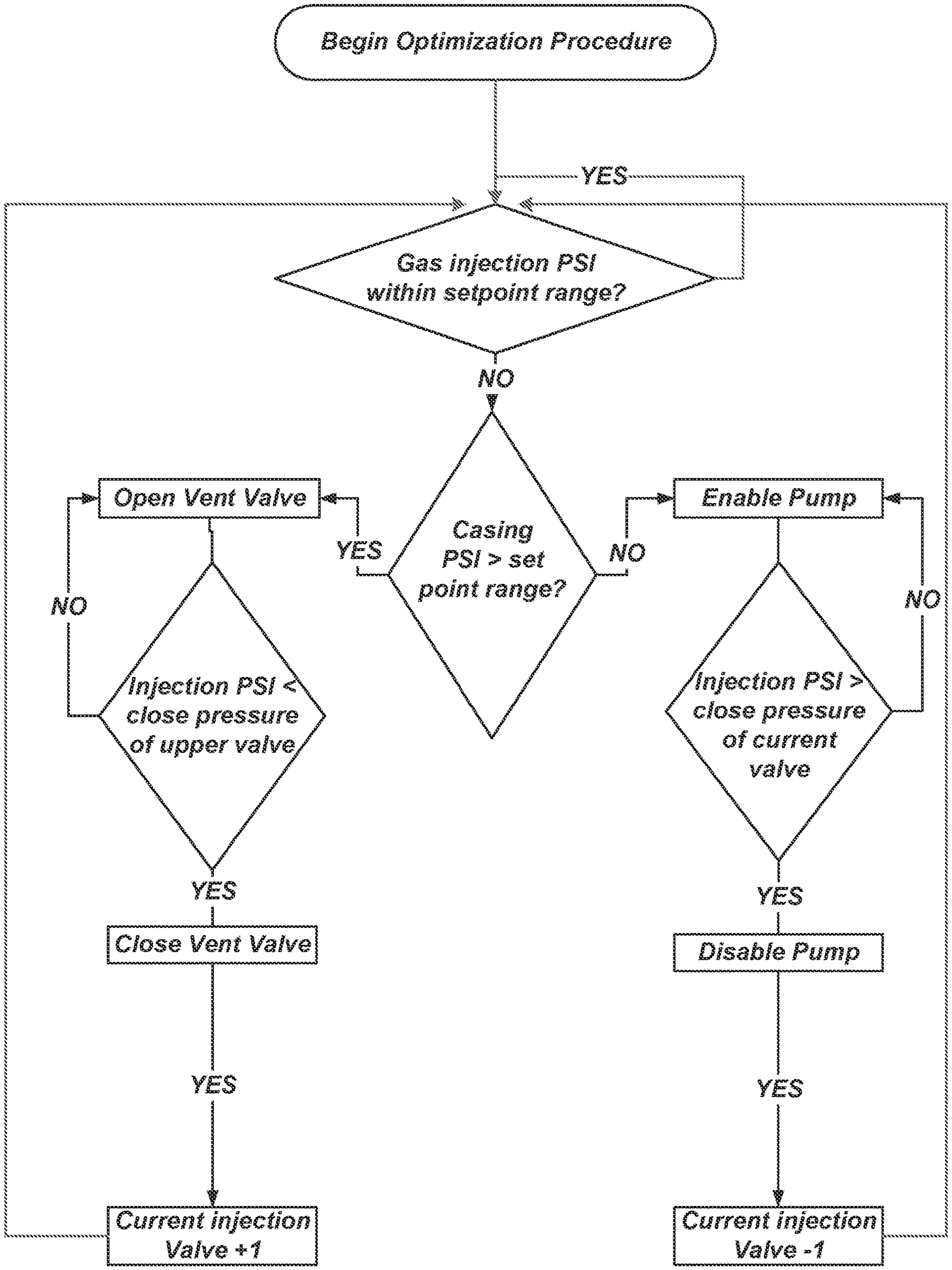
FIG. 6 is a flowchart of a method of operating a gas lift valve system according to an embodiment of the disclosure.

FIG. 6 is a flowchart of a method of operating a gas lift valve system, which may be performed by any of the gas lift systems discussed herein. As shown in FIG. 6, an optimization of the gas injection procedure may be implemented by monitoring (e.g., detecting) one or more conditions of the system (e.g., a pressure of the gas injection). In response to this monitoring of pressure, the system may open (e.g., reopen) one or more valves such that the lowermost valve is in an uphole direction (e.g., valve up), may close one or more additional valves such that the lowermost valve is in a downhole direction (e.g., valve down), or may determine the operating conditions are in a suitable range. While this process is discussed in a normally open configuration, the opening and closing of valves may be reversed in a normally closed configuration.

Where the pressure of the gas injection has risen above a desired operational range, this scenario may indicate that injected gas is not migrating from the casing into the tubing. Such a scenario may occur if a lower valve below the last injection valve is not open or is still covered by fluid. Once such a deviation is determined, another property may be monitored (e.g., the pressure in the casing) to determine if it is operating within an expected range. If the casing pressure is greater than an expected value or range, and as a precautionary measure, the valve located immediately above the current injection valve is reopened to protect from a high-pressure gas system failure. Once the pilot pressure is below a closing pressure of the upper valve that was opened, the valve may be again closed returning operations to the original injection valve.

Where the gas injection pressure has dropped below the operational range, this may indicate that injected gas is migrating through more than one valve. Such a scenario may occur as a deeper gas injection valve is uncovered unloading production fluids. If the casing pressure is less than an expected value or range, the system may enable a pump to increase the pilot pressure closing of the current valve. After closing one or more valves (e.g., the current lowermost valve), the process may continue at a new lower valve than a lower position downhole to achieve single point injection on the recently opened downhole valve.

Figure 7:
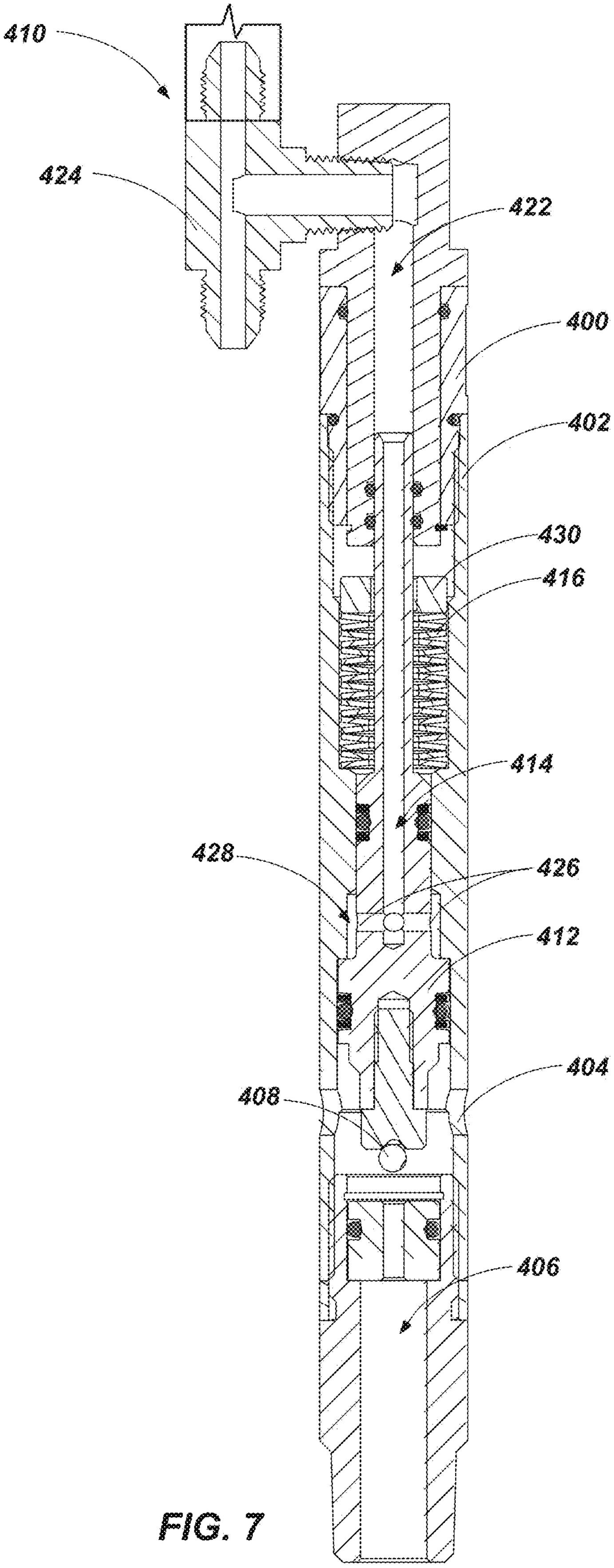
FIG. 7 is a cross-sectional view of a gas lift valve in an open position according to an embodiment of the disclosure.

FIG. 7 is a cross-sectional view of a gas lift valve 400 in an open position. The gas lift valve 400 may be similar to and include one or more components and features of any of the valves discussed herein. As shown in FIG. 7, a biasing feature 416 (secured in the gas lift valve 400 between a portion of the housing 402 and a spacing collar 430) may act to bias a valve element 408 of the gas lift valve 400 in an open position. For example, the biasing feature 416 may be selected to hold the valve element 408 in an open position when a substantial pressure equilibrium environment is experienced in the gas lift valve 400. However, the biasing feature 416 may be selected (e.g., the force and/or stiffness supplied by the biasing feature 416) such that pressure differentials experienced in the gas lift valve 400 may act to move the valve element 408 between the open position and the closed position. For example, when a relative increase in pressure is experienced in a downhole portion of the gas lift valve 400 (e.g., in the fluid pathway between a fluid inlet 404 and a fluid outlet 406 from fluid flowing into or out of the wellbore or substantially static fluid in this volume) may act on the valve element 408 to move the valve element 408 to an open position (e.g., from the closed position or to a relatively more open position). In a similar manner, fluid pressure in an uphole portion of the gas lift valve 400 (e.g., in a chamber 422 in communication with a control line 410, which may be similar to the control pilot fluid line 110 (FIG. 1)) may be relatively greater than the pressure in the downhole portion of the gas lift valve 400 and may act to move the valve element 408 toward the closed position.

As depicted in FIG. 7, a control line fitting 424 may couple with a lateral or radial portion of the gas lift valve 400 (e.g., at a threaded coupling) and supply pressure from the control line 410 in a lateral or radial direction into the gas lift valve 400. The pressurized fluid may travel axially within the gas lift valve 400 to apply a force on one or more surfaces of the gas lift valve 400 to move a valve stem 412 in communication with the valve element 408 in the downhole direction (e.g., to the closed position). For example, an opening 414 defined in the valve stem 412 may enable the fluid supplied from the control line 410 via the fitting 424 to travel through a portion of the valve stem 412 to openings 426 defined in a middle or central portion of the valve stem 412. After exiting the valve stem 412 into a chamber (e.g., annular chamber 428), the fluid pressure may act on the valve stem 412 to force it toward the closed position.

FIGS. 8 through 11 are partial cross-sectional views of various portions of a gas lift valve including a seal, where the gas valves may comprise one or more components of any of the gas lift valves discussed herein.

Figure 8:
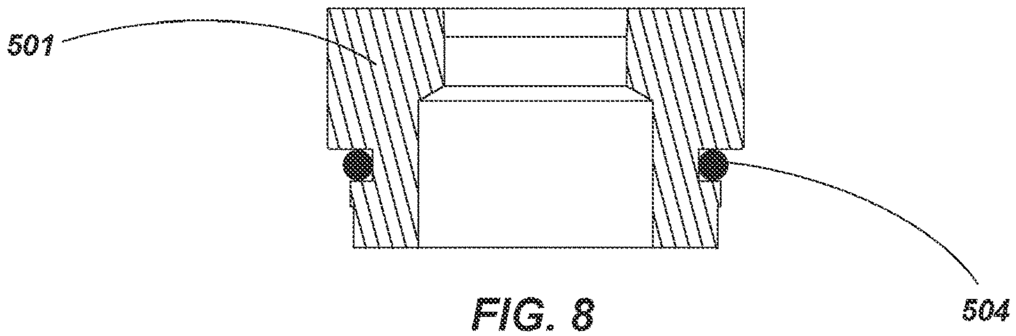
FIGS. 8 through 11 are partial cross-sectional views of various portions of a gas lift valve including a seal according to an embodiment of the disclosure.

As shown in FIG. 8, an insert element 501 of a housing of a gas lift valve (e.g., such as the housings of gas lift valves discussed above) includes an O-ring 504 that defines a seal between the insert element 501 and the portion of the housing in which the insert element 501 is received. In some embodiments, the insert element 501 of the housing of the gas lift valve may be any portion of the gas lift valve including, for example, a valve cap (e.g., a valve cap having an annular passage extending therethrough), a valve element, a valve stem, a valve seat, a piston, and/or another portion of the gas lift valve.

Figure 9:
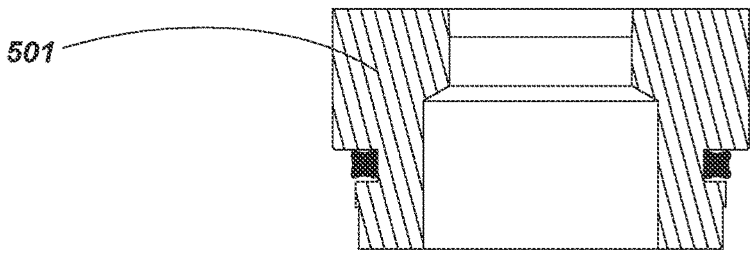

As shown in FIG. 9, the insert element 501 of the housing of the gas lift valve includes a sealing ring 506 including multiple sealing lips (e.g., a double lip seal with lips on opposing axial ends of the sealing ring 506). Such a sealing ring 506 may define one or more seals between the insert element 501 and the portion of the housing in which the insert element 501 is received.

Figure 10:
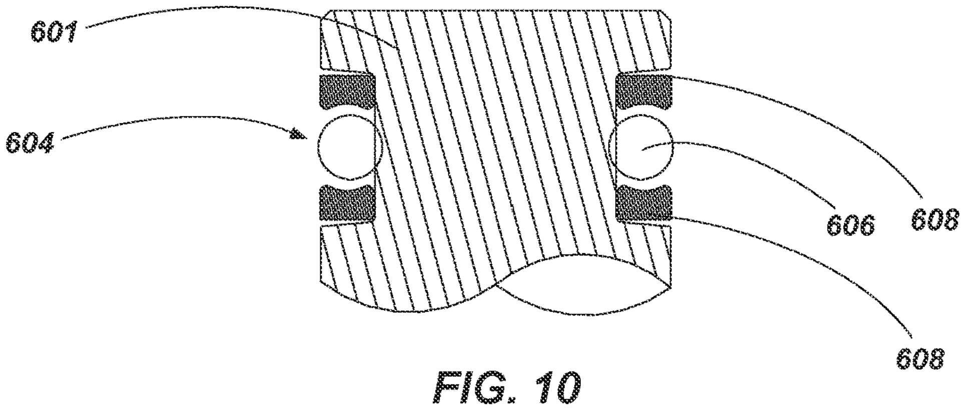

As shown in FIG. 10, an insert element 601 of a housing of a gas lift valve includes a sealing assembly 604 with a primary sealing ring 606 and one or more backup rings 608 (e.g., two one or more backup rings 608 on opposing axial sides of the primary sealing ring 606). The one or more backup rings 608 may act to protect the primary sealing ring 606 during use (e.g., by preventing extrusion and/or unwanted contact with metal parts of the housing 602). As above, the sealing assembly 604 defines a seal between the insert element 601 and the portion of the housing in which the insert element 601 is received. In some embodiments, the insert element 601 of the housing of the gas lift valve may be any portion of the gas lift valve including, for example, a valve stem (e.g., a valve stem that is movable within the housing 602), a valve element, a valve cap, a valve seat, a piston, and/or another portion of the valve 60.

Figure 11:
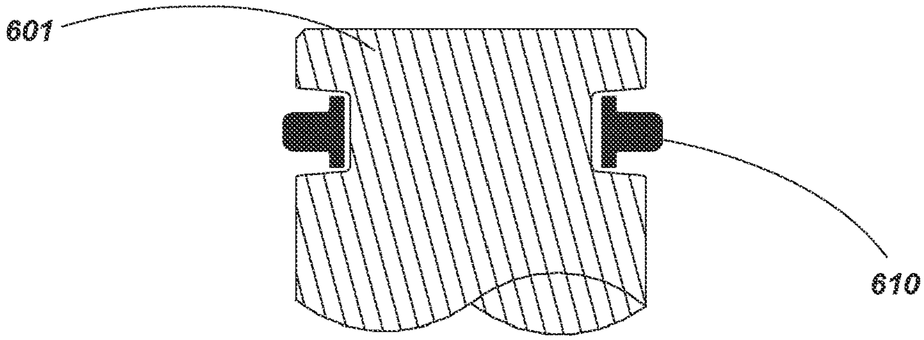

As shown in FIG. 11, the insert element 601 of the housing of the gas lift valve includes a sealing ring 610 including T-shaped seal. Such a sealing ring 610 may include a relatively wider base portion being positioned in a radially inward location (e.g., within a channel in the insert element 601) with a relatively narrower protrusion extending radially outward from the base portion. As above, the sealing ring 610 may define one or more seals between the insert element 601 and the portion of the housing in which the insert element 601 is received.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. Further, the words "including," "having," and variants thereof (e.g., "includes" and "has") as used herein, including the claims, shall be open-ended and have the same meaning as the word "comprising" and variants thereof (e.g., "comprise" and "comprises"). In addition, features from one embodiment may be combined with features of another embodiment while still being encompassed within the scope of the disclosure as contemplated by the inventors.

What is claimed is:

1. A gas lift valve, comprising:

a housing comprising:

a pilot fluid inlet for receiving a pilot fluid from a pilot fluid source;

a fluid inlet for receiving annulus fluid; and a fluid outlet for conveying the annulus fluid to a production tubing in a downhole location of a wellbore;

a valve element for selectively placing the fluid inlet in communication with the fluid outlet in an open position of the valve element and to restrict communication between the fluid inlet and the fluid outlet in a closed position of the valve element, wherein, in the open position of the valve element, at least a portion of the annulus fluid is enabled to move through the valve element and into the production tubing in the downhole location of the wellbore and/or a portion of a production fluid is enabled to move through the valve element and into a wellbore annulus;

a biasing feature to bias the valve element in a first state of the open position or the closed position, the biasing feature comprising a plurality of stacked disc spring washers and/or wave springs in a quantity selected to provide a desired spring constant value, and wherein a majority of the biasing force is provided by the plurality of stacked disc spring washers and/or wave springs;

a single acting piston that is separate from, but coupled to a valve stem, the valve stem extending through the biasing feature and coupled to the valve element; and a control pilot fluid line actuator for supplying a force to the valve element to overcome a biasing force of the biasing feature and to move the valve element to a second state of the open position or the closed position, wherein the force supplied to the valve element from the control pilot fluid line actuator is configured to be applied at only a pressure chamber at an uphole location on an uphole portion of the single acting piston that is spaced from the biasing feature by the uphole portion of the single acting piston; and wherein the biasing feature comprising the plurality of stacked disc spring washers and/or wave springs is located in a sealed chamber within the housing and extending around the valve stem, the biasing feature being secured by a spacing collar positioned on the valve stem and a portion of the housing, the sealed chamber being defined by a first seal on the single acting piston and a second seal on the valve stem that is separate from the single acting piston, the sealed chamber being sealed from both the pilot fluid in the pressure chamber and the annulus fluid, the sealed chamber being defined at least partially by the housing, the single acting piston, and the valve stem.

2. The gas lift valve of claim 1, wherein the plurality of stacked disc spring washers and/or wave springs are arranged in a series orientation, a parallel orientation, or a series parallel orientation.

3. The gas lift valve of claim 1, wherein the uphole location on the single acting piston for receiving the force supplied to the valve element from the control pilot fluid line actuator comprises a substantially planar surface of the single acting piston extending from one lateral side of the housing to another lateral side of the housing.

4. The gas lift valve of claim 1, wherein the gas lift valve includes only a single control pilot fluid line comprising the control pilot fluid line actuator to move the valve element to the open position in a first linear direction and includes the plurality of stacked disc spring washers and/or wave springs to move the valve element to the closed position in a second linear direction that is opposite to the first linear direction.

5. The gas lift valve of claim 1, wherein the spacing collar is disposed in the sealed chamber within the housing, the spacing collar being positioned adjacent to the plurality of stacked disc spring washers and/or wave springs to secure the plurality of stacked disc spring washers and/or wave springs in the housing, the spacing collar for enabling use of differing quantities of the plurality of stacked disc spring washers and/or wave springs in the housing.

6. The gas lift valve of claim 1, further comprising an insert element received at least partially within the housing and at least one seal positioned between the insert element and the housing, the at least one seal comprising at least one of a O-ring, a multiple lipped seal, a T-shaped seal, or a seal assembly including one or more backup rings.

7. The gas lift valve of claim 6, wherein the insert element comprises one or more of a valve cap, the valve element, a valve stem, a valve seat, or the single acting piston.

8. A gas lift valve system, comprising:

a pilot fluid or control fluid source;

a plurality of gas lift valves coupled to the pilot fluid or control fluid source by a single actuation control pilot fluid line, each gas lift valve of the plurality of gas lift valves comprising:

a housing comprising:

a control fluid inlet for receiving fluid through the actuation control pilot fluid line;

a production fluid inlet connecting a casing or wellbore annulus to the housing; and a production fluid outlet for directing a casing fluid between a production tubing and a wellbore;

a valve element for selectively placing the production fluid inlet in communication with the production fluid outlet in an open position of the valve element and to restrict communication between the production fluid inlet and the production fluid outlet in a closed position of the valve element, wherein, in the open position of the valve element, at least a portion of the casing fluid is enabled to move through the valve element and into the production tubing and/or a portion of a production fluid is enabled to move through the valve element and into the casing or wellbore annulus;

a biasing element to bias the valve element in one of the open position or the closed position; and an actuator for supplying a force through the fluid from the control fluid source via the actuation control line to the valve element to overcome a biasing force of the biasing element and to move the valve element to the other one of the open position or the closed position, the biasing element being positioned within a sealed chamber of the housing that is defined between a piston of the actuator and a portion of the valve element; and a control system configured to supply the fluid from the control fluid source to one or more of the plurality of gas lift valves at a selected pressure only through the single actuation control pilot fluid line to move the one or more of the plurality of gas lift valves against the biasing force of the biasing element of the gas lift valve of the plurality of gas lift valves, wherein the biasing element of each gas lift valve of the plurality of gas lift valves is selected to provide an amount of the biasing force that is different from the biasing force of at least one other gas lift valve of the plurality of gas lift valves, wherein the force supplied to at least one of the plurality of gas lift valves by the control system is selected based at least partially on a pressure of at least one of the casing fluid or the production fluid, and wherein the control system is not configured to supply any fluid to the one or more of the plurality of gas lift valves to move the one or more of the plurality of gas lift valves in a direction aligned with the biasing force of the biasing element of the gas lift valve of the plurality of gas lift valves; and wherein a first biasing element of a first gas lift valve of the plurality of gas lift valves comprises a first plurality of stacked disc spring washers and/or wave springs and a second biasing element of a second gas lift valve of the plurality of gas lift valves, the second gas lift valve being downhole of the first gas lift valve, comprises a second plurality of stacked disc spring washers and/or wave springs, the second plurality of stacked disc spring washers and/or wave springs of the second gas lift valve including fewer stacked disc spring washers and/or wave springs than the first plurality of stacked disc spring washers of the first gas lift valve.

9. The gas lift system of claim 8, wherein the force supplied to each gas lift valve of the plurality of gas lift valves from the actuation control line is configured to be applied at a face on a first side of the piston of the gas lift valve that is spaced from the biasing element, and wherein the biasing element is contained in a sealed chamber at least partially defined by a second side of the piston, the housing, and the valve element.

10. The gas lift system of claim 9, wherein the control system is configured to supply the fluid at the selected pressure that is greater than a pressure required to overcome the biasing force of the biasing element.

11. The gas lift system of claim 8, wherein the biasing force of the biasing element of each gas lift valve of the plurality of gas lift valves is configured to incrementally increase as the plurality of gas lift valves extend downhole in a wellbore.

12. The gas lift system of claim 11, wherein the control system is configured to supply the fluid at the selected pressure in order to independently actuate each gas lift valve of the plurality of gas lift valves above a selected elevation within the wellbore.

13. The gas lift system of claim 8, wherein the control system is configured to supply the fluid at the selected pressure in order to move the valve element to one of the open position or the closed position in at least one of the plurality of gas lift valves and based on a pressure detected in a casing positioned in the wellbore and/or in a gas injection stream that is provided to the control system.

14. The gas lift system of claim 8, wherein the actuator comprises a piston and a valve stem, the piston and the valve stem being separate components that are coupled to each other.

15. The gas lift system of claim 14, wherein the biasing element is secured with a spacing collar positioned on the valve stem and a portion of the housing.

16. The gas lift system of claim 14, wherein the biasing element extends around the valve stem, the biasing element being secured by a spacing collar positioned on the valve stem.

17. The gas lift system of claim 8, wherein the force supplied to each gas lift valve of the plurality of gas lift valves from the actuation control line is configured to be applied to a face of the piston of the gas lift valve that is spaced uphole from the biasing element, and wherein the face of the piston is a substantially planar surface.

18. The gas lift system of claim 8, wherein the first plurality of stacked disc spring washers and/or wave springs is relatively larger than the second plurality of stacked disc spring washers and/or wave springs, and where the second gas lift valve comprises a second spacer positioned adjacent the second plurality of stacked disc spring washers and/or wave springs.

19. A method of operating a gas lift valve assembly, the method comprising:

supplying, with an actuation control line, a fluid from a fluid source into a wellbore at a selected pressure with a control system to a plurality of gas lift valves positioned at various elevational locations in the wellbore;

providing differing biasing forces in each of the plurality of gas lift valves with a plurality of stacked wave springs in each of the plurality of gas lift valves, the quantity in the plurality of stacked wave springs differing between various gas lift valves of the plurality of gas lift valves;

selecting the selected pressure based at least partially on a pressure of a wellbore fluid in the wellbore;

actuating a valve element of the plurality of gas lift valves with a force supplied by the fluid via the actuation control line;

overcoming the differing biasing forces of the plurality of gas lift valves to move the valve element to one of an open position enabling fluid flow through a respective gas lift valve of the plurality of gas lift valves or a closed position restricting the fluid flow through the respective gas lift valve of the plurality of gas lift valves; and returning the plurality of gas lift valves to the open position or the closed position using primarily the biasing force of the wave springs of the plurality of gas lift valves.

20. The method of claim 19, further comprising reducing pilot fluid pressure to return the valve element of the plurality of gas lift valves to the other one of the open position or the closed position.

21. The method of claim 19, further comprising supplying the fluid at the selected pressure in order to move the valve element to one of the open position or the closed position in the plurality of gas lift valves based on a pressure detected in a casing positioned in the wellbore and/or in a gas injection stream that is provided to the control system.

22. The method of claim 19, further comprising pressurizing the fluid with a pump to actuate at least one additional gas lift valve of the plurality of gas lift valves.

* * * * *